Feb. 21, 1967    L. HIDEG    3,304,922

ENGINE CONSTRUCTION

Filed Sept. 29, 1964    3 Sheets-Sheet 1

LASZLO HIDEG
*INVENTOR.*

BY John R. Faulkner
Robert E. McCollum
*ATTORNEYS*

Feb. 21, 1967 — L. HIDEG — 3,304,922
ENGINE CONSTRUCTION
Filed Sept. 29, 1964 — 3 Sheets-Sheet 2

LASZLO HIDEG
INVENTOR.

BY John R. Faulkner
Robert E. McCollum
ATTORNEYS

Feb. 21, 1967 L. HIDEG 3,304,922
ENGINE CONSTRUCTION
Filed Sept. 29, 1964 3 Sheets-Sheet 3

INVENTOR.
LASZLO HIDEG
BY John R. Faulkner
Robert E. McCollum
ATTORNEYS

Patent document text …

United States Patent Office 3,304,922
Patented Feb. 21, 1967

3,304,922
ENGINE CONSTRUCTION
Laszlo Hideg, Dearborn Heights, Mich., assignor to Ford Motor Company, Dearborn, Mich., a corporation of Delaware
Filed Sept. 29, 1964, Ser. No. 400,094
5 Claims. (Cl. 123—32)

This invention relates to an internal combustion engine of the spark ignition type. More particularly, it relates to one utilizing a stratified charge type combustion process.

Conventional internal combustion engines generally are not efficient over the entire load and speed range, one reason for this is that when the fuel-air charge is mixed outside of the combustion chamber, in a carburetor, for example, and ignited by a single spark plug, a charge leaner than 18 or 19 parts air to 1 part fuel generally will not ignite. The engine is, therefore, designed with a compromise. At times it operates with a chemically correct air-fuel mixture, while at other times overrich mixtures are present. As a result, the temperature losses to the cylinder walls are higher, the efficiency of converting the heat energy to mechanical energy is decreased, and the pumping losses are greater.

The invention eliminates the above disadvantages by providing an internal combustion engine that burns fuel, such as gasoline, for example, in the presence of an excess of air at light loads, and provides efficient performance over the entire load and speed range. It provides an engine construction having a separate swirl type combustion chamber to one side of the center line of the cylinder bore, in the cylinder head, or in the top of the piston. Alternately, it can be located outside of the cylinder bore with a lateral transfer passage providing tangential entrance of the air from the cylinder into the chamber.

In one preferred embodiment, the combustion chamber is provided with a secondary air-fuel mixture intake valve; in another embodiment, a fuel injector nozzle. Alternately, as shown in still another embodiment, the primary air intake valve can be positioned close to the cylinder wall and to the mouth of the combustion chamber so that an intake manifold located rich mixture tube or injection nozzle can direct fuel past the open valve directly into the inlet of the combustion chamber.

The location of the combustion chamber in this manner induces a stratified charge combustion process for burning of a small amount of fuel in an excess of air at part loads, and improved performance over the entire load and speed span.

In general, a charge of fresh air is taken into the main cylinder bore with a swirling motion during the intake stroke of the engine. In the case of the constructions utilizing a secondary intake valve or direct fuel injection into the combustion chamber, a rich mixture charge of pure fuel is also introduced into the combustion chamber at this time.

During the compression stroke of the piston, the squish action of the piston on the swirling cylinder volume air causes this air to be transferred laterally into the bottom half of the combustion chamber.

During the early stages of compression, the squish air velocity is low, resulting in an air transfer rate that promotes mixing of the cylinder volume air with the charge in the combustion chamber. During the later stages of compression, as the piston approaches the top dead center position, the velocity of the air transferred into the combustion chamber rises at such a fast rate that the air enters in the form of a jet to the bottom layer of the contents of the chamber. As a result, the incoming jet of air does not have sufficient time to mix with the chamber contents. The jet of air, therefore, pushes the existing contents of the combustion chamber towards one portion of the chamber at a suitably positioned ignition means, resulting in a fuel impregnated layer of air at that point. The throttling or non-throttling of the air-fuel charge, as the case may be, and the particular dimensions and other variables of the combustion chamber and cylinder volume are chosen so that the impregnated layer will have the correct strength adjacent the spark plug at the time of ignition. The thickness of the layer, and the initiation of injection of course, will vary with the load. If fuel is introduced during the intake stroke, a minute amount may be drawn into the main cylinder volume from the combustion chamber. However, the construction is such that if this did occur, the mixture in the main cylinder volume would still be ignitible. That is, it would not be leaner than, say, 30 parts air to 1 part fuel, for example.

Once combustion is obtained, the ensuing flame and increase in temperature spreads through the lean mixture in the remaining portions of the combustion chamber, and spreads out into the main cylinder volume. Thus, complete combustion occurs, and substantially no unburned hydrocarbons and carbon monoxide remain in the cylinder volume. The hydrocarbons combine with the excess air, and the carbon monoxide becomes carbon dioxide.

At greater loads, the magnitude of the impregnated layer in the combustion chamber increases, so that as full load is approached, the mixture charge will fill the combustion chamber, and may even spill out into the main cylinder volume to mix with the air therein. At full loads, it may also be desirable to add additional fuel through the main intake valve.

It is one of the objects of the invention, therefore, to provide an internal combustion engine that burns fuel in the presence of an excess of air at light loads, and provides maximum efficiency of operation over the total load and speed span.

It is another object of the invention to provide an internal combustion engine construction utilizing a localized swirl combustion chamber for combustion by a stratified charge process so that the fuel is burned efficiently at all load and speed conditions of operation.

It is a still further object of the invention to provide an internal combustion engine having a swirl type combustion chamber located either to one side of the center line of the cylinder or outside of the cylinder bore; and connected to the cylinder volume by an air flow passage providing tangential flow into the combustion chamber; the squish air transfer rate during the early stages of compression promoting mixing of the cylinder volume air with a rich mixture content of the combustion chamber; the later stages of compression causing the squish air to enter the combustion chamber in the form of a jet of air to the bottom layers of the contents of the chamber, so that the top layers are pushed close to an ignition means substantially without mixing with the jet of air, thereby resulting in a correct strength mixture layer at the ignition means at the point of ignition. This provides combustion of a small portion of fuel in a localized area, and the burning of a much leaner charge in the main cylinder volume if any fuel spills into it. An increase in the fuel economy of the engine thus occurs.

It is also an object of the invention to increase the fuel economy of an internal combustion engine by providing a construction that utilizes the rapidly increasing rate of velocity of the air due to the squish action of the piston during the final stages of compression to produce a correct strength layer of air-fuel mixture charge adjacent the spark plug at the time of ignition.

Other objects, features, and advantages of the invention will become apparent upon reference to the succeeding detailed description thereof, and to the drawings illustrating the preferred embodiments thereof; wherein, FIGURE 1 is a cross-sectional view of a portion of an internal combustion engine embodying the invention;

Figure 1:
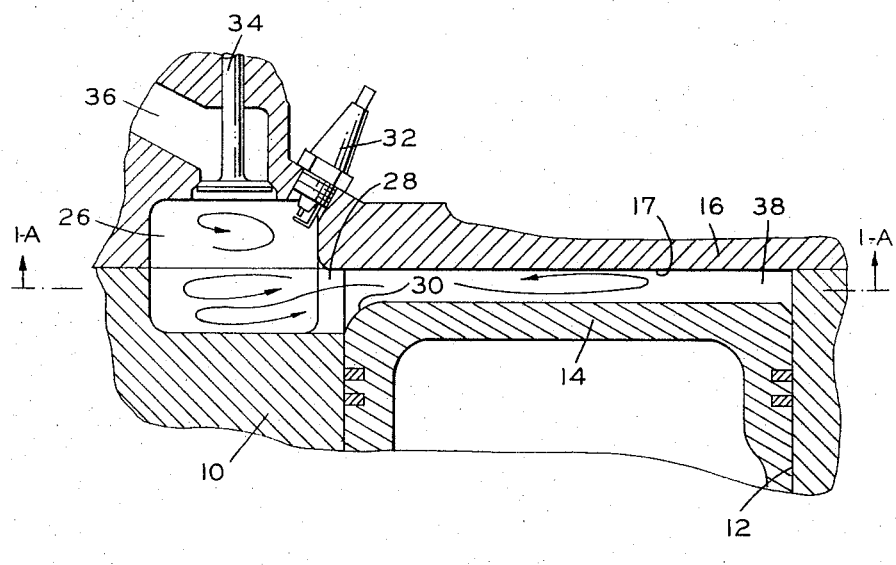
FIGURE 1A is a cross-sectional view taken on a plane indicated by and viewed in the direction of the arrows 1A—1A of FIGURE 1.

FIGURE 1 shows a four-cycle engine construction embodying the stratified charge combustion process of the invention. For clarity, only one cylinder of the engine is illustrated. It will be clear, however, that any multiple of cylinders can be provided so long as they are constructed in the manner to be described.

Figure 1A:
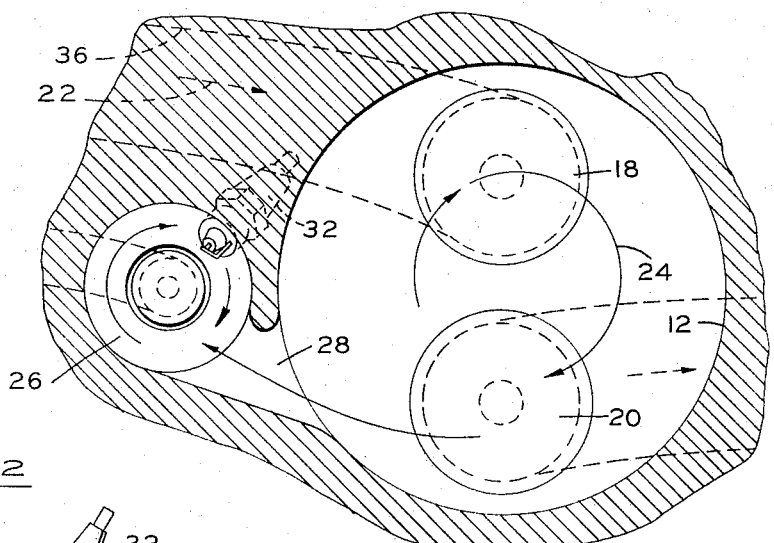

FIGURES 1 and 1A show an engine having a block 10 with a cylindrical bore 12 slidably receiving a flat top piston 14. The piston is adapted to reciprocate vertically in opposite directions in the usual manner, and is connected to an engine crankshaft (not shown) by any suitable means. The cylinder bore 12 is closed at its upper end by a head 16 having a flat face 17 that is substantially parallel to the piston top. The head has the usual main intake and exhaust valves 18 and 20 (FIGURE 1A). The intake valve, when opened by means not shown, admits a controlled or throttled amount of fresh air to the cylinder volume. The port of the valve would be designed to induce a swirling motion to the incoming charge of air 22 in the direction of the arrow 24. A substantially cylindrical or spherically shaped swirl combustion chamber 26 is positioned outside and to one side of cylinder bore 12, partly in the block 10 and partly in cylinder head 16.

The combustion chamber 26 is connected to cylinder bore 12 by a passage 28 that is offset to one side of the chamber (FIGURE 1A) to induce a tangential transfer of air into the chamber. The passage has a heighth equal to approximately one-half to two-thirds of the total heighth of chamber 26. The passage cooperates with a rounded edge 30 of piston 15 to control turbulence. Piston 14, otherwise, is of a conventional construction.

Chamber 26 has an ignition means near the top corner of the chamber consisting of a spark plug 32, for example. It also has a secondary air-fuel mixture intake valve 34 at the top of the chamber that controls the introduction into the chamber of an air-fuel mixture charge from an intake manifold channel 36. The channel 36 would be supplied from a rich mixture carburetor or continuous flow manifold injector, not shown.

Intake valve 34 is recessed into cylinder head 16 with a small clearance 35 between the head and the counterbore. This permits delayed and fast opening of the valve, and earlier closing of the intake channel 36. Intake valve 34 is controlled to operate in parallel with the main intake valve 18, by means not shown.

In operation at light loads, the primary intake valve 18 will open during the intake stroke of piston 14 to cause a charge of swirling fresh air to be taken into the cylinder volume. At an appropriate time during the intake stroke, the secondary intake valve 34 is throttled open to admit a small volume of rich air-fuel mixture into combustion chamber 26. The valves then close. As piston 14 begins its compression stroke, the air in the main cylinder is pushed upwardly and squeezed laterally to enter combustion chamber 26 through passage 28 and start a swirling motion in the chamber. During the early stages of compression, the velocity of the air transferred is slow enough to promote mixing of this air with the rich fuel mixture in chamber 26. This promotes evaporation of the fuel and dispersion of the fuel in the air to provide the correct strength to the mixture.

As the piston approaches its top dead center position, the sudden decrease in volume in the main cylinder causes the rate of transfer of air from the cylinder into the combustion chamber to increase very rapidly, so that, at substantially 35° before top dead center position, for example, the air flows laterally into the combustion chamber in the form of a jet to the bottom layer of the contents of chamber 26. That is, the air is now moving at such a fast rate that it does not have sufficient time to mix with the previous contents of the combustion chamber. As a result, the jet of air pushes the rich mixture upwardly towards spark plug 32. The previous contents of the chamber, therefore, become compressed, and the top layer of air impregnated with fuel to the right mixture strength for ignition; that is, the timing is such that a correct strength air-fuel mixure will be available at the spark plug at the time of ignition. This may be a stoichiometric mixture at part load operation, and a rich mixture at other loads.

Spark plug 32 is then fired, effecting combustion of the fuel impregnated layer of air adjacent the plug. The ensuing flame and increase in heat promotes an increase in mixing of any unburned fuel with the remaining air in the combustion chamber, which then also burns to produce a high rate of mixing at the mouth of chamber 26 and passage 24. The flame then spreads into the cylinder volume to burn whatever lead mixture may be present therein and effect complete combustion. The resultant expansion of the gases and pressure rise will move the piston through its power and exhaust strokes.

Combustion chamber 26 in this embodiment contains about one-half of the total air charge. Since the impregnated layer in the chamber can be confined to one-half to one-third of the chamber content, it can be seen that light load operation with the right mixture strength can be achieved by using as low as one-quarter to one-sixth of the total amount of fresh air intake Thus, at light loads, by initiating combustion only in the upper portion of combustion chamber 26, it requires only a small volume of fuel, and, therefore, provides economical operation. A very lean mixture, that is as much as 30 parts air to 1 part fuel, can exist, therefore, in the cylinder volume proper and still be burned since the initial combustion is begun with the correct strength charge in chamber 26. This provides complete oxidation of any unburned hydrocarbons and carbon monoxides that may be present in the cylinder volume.

For very light or low loads, some throttling of the fresh air flow through primary air intake valve 18 may be desirable to maintain an ignitible mixture ratio in combustion chamber 26.

Proceeding in the opposite direction, efficient operation at medium loads is obtained merely by increasing the volume of rich mixture intake through valve 34 in proportion to the load. That is, the mixture will increase to a point where the walls of chamber 34 may be wetted with fuel and, near full load conditions, may spill out of chamber 34 into the main cylinder. During compression, the squish action of the piston will compress the mixture back into combustion chamber 26, where it then mixes with the following fresh air charge in the manner previously described. The incoming air flow into the chamber will evaporate the fuel from the chamber walls, resulting in the impregnation of a larger volume of air in the chamber. The final jet of cylinder volume air pushing the previous contents of the combustion chamber towards the spark plug 32 results in a top layer rich mixture of greater magnitude than for light loads. That is, the depth of the layer will vary in proportion to the load. While the mixture richness increases with the load, fast completion of burning is maintained due to the additional mixing between adjacent air layers because of the pressure rise.

At full loads, some fuel can also be added directly to the main cylinder volume through the primary intake valve 18 to assure a full utilization of all of the air in the cylinder.

Figure 2:
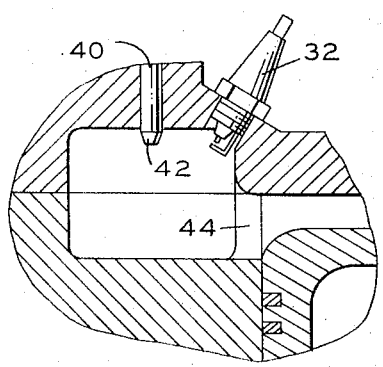
FIGURE 2 shows a modification of a portion of the engine of FIGURE 1.

FIGURE 2 illustrates a construction for achieving the same operation using direct fuel injection. In this figure, a direct injection of fuel into combustion chamber 26 is substituted for the air-fuel mixture introduced through intake valve 34 of FIGURE 1. That is, in FIGURE 2, the secondary intake valve 34 of FIGURE 1 is replaced by a fuel injector 40. The injector would have a nozzle 42 of a type, for example, that would inject a well atomized, low particle velocity fuel spray through, say, a 75° to 120° cone angle into the combustion chamber. The injection would take place during the piston compression stroke, with the injection ending somewhere between 100° to 30° before top dead center position, for example. Light loads would result in short injection timing. One of the advantages of direct injection is, of course, that the process can be operated at very light loads without primary air intake throttling because pure fuel is being injected into the combustion chamber.

The operation of the FIGURE 2 construction is substantially the same as described in connection with the FIGURE 1 embodiment. With direct fuel injection, however, the mixture initially in combustion chamber 26 may be richer than that provided by the construction of FIGURE 1. This can be compensated for, however, by a slight modification of the entrance portion to the combustion chamber. The mouth portion 44 may be enlarged slightly to provide the increased flow of air into the chamber so that the correct top layer mixture strength exists at the spark plug at the time of ignition.

In all other respects, the same operation occurs; that is, for light loads, the initial compression stroke causes a transfer of fresh air from the cylinder volume into the combustion chamber at a slow rate to induce a swirling motion to the air and promote mixing of the air with the fuel being injected through nozzle 42. During the later stages of compression, the rate of transfer of the cylinder volume squish air into chamber 26 rises so rapidly that the air is introduced to the bottom layer of the contents of the combustion chamber in the form of a jet. This pushes the contents as a whole upwardly to provide a fuel impregnated top layer of the right mixture strength at the spark plug at the time of ignition. The operation for medium and full loads is similar to that already described in connection with the construction of FIGURE 1, and, therefore, is not repeated.

Figure 3:
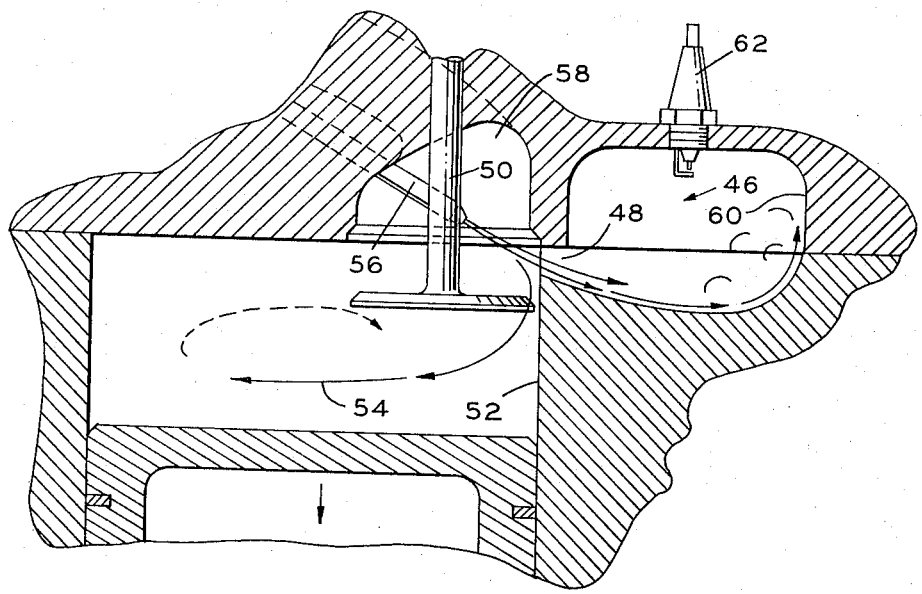
FIGURE 3 is a cross-sectoinal view of another embodiment of the invention.
Figure 3A:
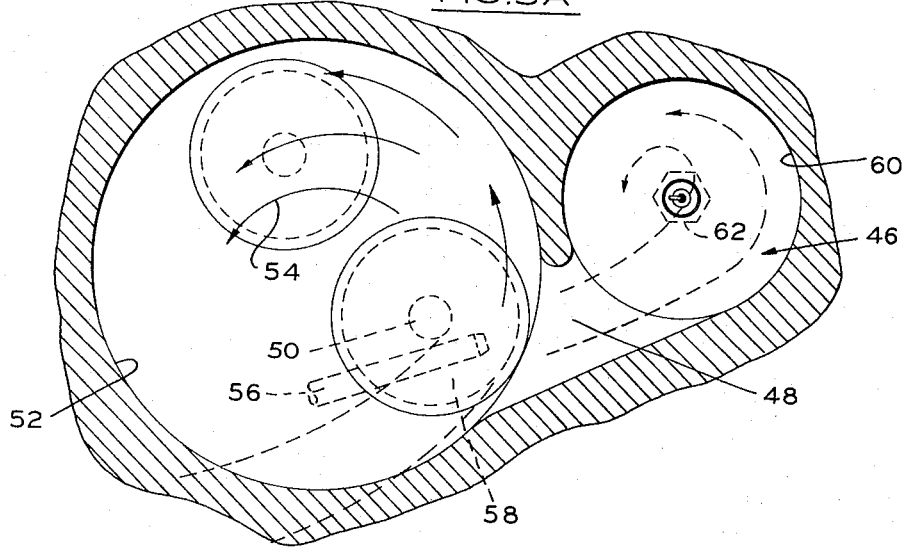
FIGURE 3A is a cross-sectional view taken on a plane indicated by and viewed in the direction of the arrows 3A—3A of FIGURE 3.

FIGURES 3 and 3A illustrate another engine construction embodying the combustion process of the invention. In this embodiment, the combustion chamber 46 is again of a spherical or cylindrical shape. It is located outside of the cylinder bore in an offset manner similar to that shown in FIGURES 1 and 1A to provide a tangential entry of air from the cylinder volume to the chamber (FIGURE 3A). The chamber has a laterally extending mouth or entrance portion 48 connected to the cylinder. However, in this instance, the main intake valve 50 is located close to cylinder wall 52 and adjacent the mouth to the combustion chamber. The intake valve 50 is constructed with a swirl port 51 that causes the air entering past the open valve to be directed away from the entrance to combustion chamber 46 and into the cylinder volume in the direction of arrow 54 with a swirling motion imparted to it.

The fuel intake consists of a rich mixture intake manifold tube 56 that has a narrow fuel cone angle spray nozzle projecting into intake port 51. It is located in a position and at an angle such that the fuel is discharged from the nozzle past the open valve directly into combustion chamber 46 to wet the bottom walls. The lower surface of the mouth 48 of the chamber is angled to promote a substantially streamline flow into the chamber.

The direction of injection of fuel into chamber 46 will wet walls 60 with fuel. The cylindrical or spherical shape of the combustion chamber will cause the air transferred from the cylinder volume during compression to have a swirling motion imparted to it, which promotes evaporation and dispersion of the fuel in an efficient manner, and in the manner described previously in connection with the constructions of FIGURES 1 and 2. In this embodiment, the fuel is injected substantially at the end of the intake stroke.

In operation, therefore, at light loads, during the intake stroke, when valve 50 is open, a charge of fresh air will be directed into the cylinder volume in the direction indicated by the arrow 54. While the valve is still open, a rich air-fuel mixture will be injected from tube 56 through the valve opening gap directly into the mouth 48 of combustion chamber 46 to hit the bottom wall of the combustion chamber, as indicated by arrows 62. The duration of injection, and the amount of mixture injected, will, of course, vary in proportion to the load.

During the early stages of compression, the velocity of the swirling air in the cylinder volume is low. As the piston continues to ascend, the cylinder volume air will be transferred laterally in a direction substantially parallel to the piston top and through the mouth 48 of combustion chamber 46 to mix with the fuel mixture in it. During the later stages of compression, the sudden increase in velocity of the air being transferred into the combustion chamber causes the air to enter in the form of a jet to the bottom or corner portion of the contents of the chamber. As in the FIGURES 1 and 2 embodiments, the jet of air pushes the contents of the combustion chamber upwardly toward the spark plug 62 so that the top layer becomes impregnated with fuel to the correct mixture at the time of ignition. The remaining operation, and operation for medium and full loads, is substantially the same as described in connection with the FIGURES 1 and 2 constructions.

Figure 4:
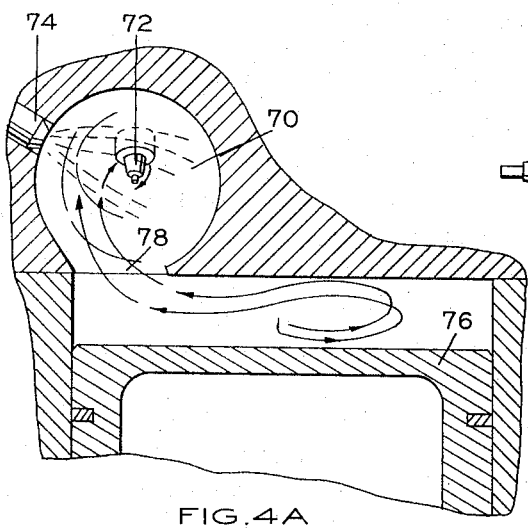
FIGURES 4 and 5 illustrate further embodiments of the invention.
Figure 4A:
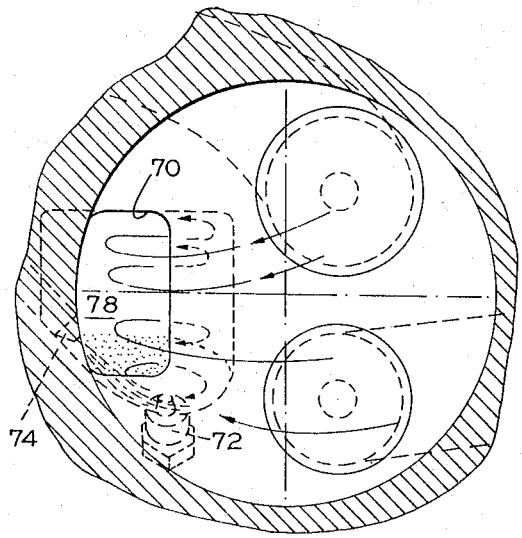
FIGURES 4A and 5A are cross-sectional views taken on planes indicated by and viewed in the direction of the arrows 4A—4A and 5A—5A of FIGURES 4 and 5, respectively.

FIGURES 4 and 4A show a still further embodiment of the invention. In this instance the swirl type combustion chamber 70 is located in the cylinder head offset to one side of the cylinder bore instead of outside the cylinder as in the previous embodiments. Also, the chamber provides swirl about a horizontal centerline as compared to the substantially vertical centerline swirl chambers of the previous embodiments. The over-all operation, however, remains the same.

As best seen in FIGURE 4A, the entrance to chamber 70 is again offset to provide a tangential flow of air into the chamber. A single spark plug 72 is provided at an appropriate location in the chamber where the correct strength mixture charge will be pushed at the time of ignition. A fuel injector nozzle 74 is provided to introduce fuel into the chamber. This embodiment uses what may be called a semi-direct fuel injection process. That is, the atomization, injection rate, injection timing, discharge cone angle and other factors affecting the direction and quality of spray are fixed, therefore, requiring less controls. The system is thus less expensive.

The operation is substantially the same as described in connection with the previous embodiments. A charge of fresh air is taken into the cylinder volume past valve 73 during the intake stroke. The air-fuel mixture is introduced through nozzle 74 to chamber 70 close to the bottom dead center position of the piston during the intake or compression stroke. During the early stages of the compression stroke of piston 76, the cylinder air is initially transferred at a low particle velocity into combustion chamber 70 through an opening 78 connecting the two. The shape of the chamber induces a swirling motion to the air in addition to that provided by the primary air intake swirl port, thus promoting mixing of the incoming air with the fuel discharged into it from nozzle 74. During the later stages of compression, the strong squish action of piston 76 causes the cylinder volume air to assume the form of a jet to the bottom or adjacent side portion of chamber 70 to push the previous air-fuel mixture charge contents toward the spark plug 72. The amount of air-fuel mixture, and the magnitude of the fuel impregnated charge adjacent the spark plug, will vary with the load so as to always be the correct strength at the plug at the time of ignition. Injection of a small amount results in the wetting of a small area of the combustion chamber, thus the impregnation of a thin swirl end layer. Longer injection brings about more splashing of the fuel, thus the impregnation of a heavier end layer.

Figure 5:
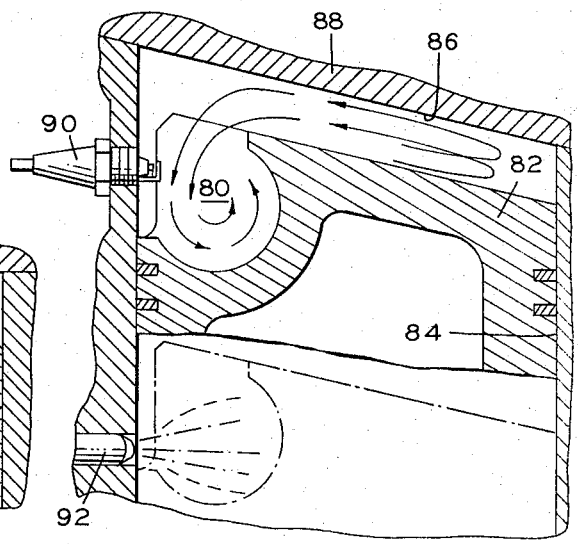
Figure 5A:
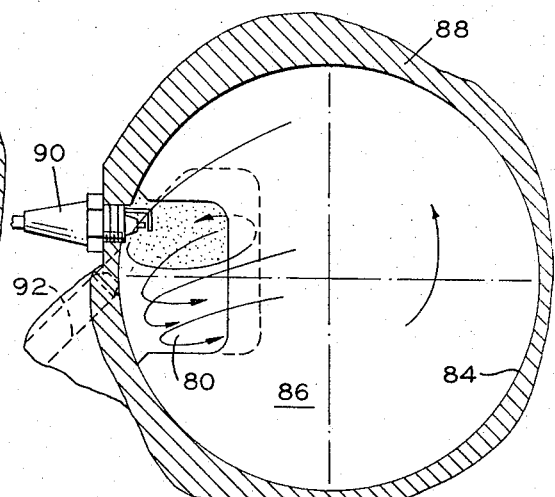

FIGURES 5 and 5A show another embodiment similar to that of FIGURES 4 and 4A using the same process of operation as previously described. In this embodiment, the combustion chamber 80 is located in the top of piston 82 and to one side of the longitudinal centerline of cylinder 84. The piston top is angled and substantially parallel to the inclined face 86 of cylinder head 88. This results in a squish area between the cylinder head face and the top of the piston of between 50–85%, which promotes the flow of air toward and into combustion chamber 80 during the compression stroke of the piston. The combustion chamber is substantially spherical, the shape of the walls inducing a swirling action of the entering air about a horizontal centerline, as in FIGURES 4 and 4A. A spark plug 90 is located in the side wall of the cylinder 84, as is also the fuel injector 92. The over-all operation is substantially the same as described in the previous embodiments. During the intake stroke, a swirling charge of fresh air is taken into the cylinder through the intake valve, not shown. Fuel is injected from the nozzle 92 into the lower portion of the combustion chamber 80 when the piston 82 is in the dotted line position 94 shown.

During the compression stroke, the initially weak squish action of piston 82 promotes the transfer of air from one side of the cylinder into combustion chamber 80 at a rate that promotes efficient mixing of the air with the fuel in chamber 80. The air transferred into the chamber has an additional swirl imparted to it due to the shape of the walls of chamber 80. During the late stages of compression, the squish action becomes so strong that the air transferred into the combustion chamber assumes the form of a jet against the bottom layer of the previous contents of chamber 80. This retards mixing of the cylinder volume jet air with the previous contents of chamber 80, and, therefore, causes the air-fuel mixture in the chamber to be compressed and pushed toward the bottom. By the time the piston has reached the full line position shown, at say, approximately 35° before top dead center position, the fuel impregnated charge will be adjacent the electrodes of spark plug 90 and at the correct mixture strength. Ignition at this time will provide combustion of the charge, resulting in a spreading of the flame throughout the chamber and into the cylinder volume. Thus, complete burning and oxidation of any unburned hydrocarbons and carbon monoxide in the cylinder volume occurs. The duration of injection and point of initial injection will, of course, vary with the load.

From the foregoing, it will be seen that the invention utilizes a swirl type combustion chamber stratified air layer impregnation combustion process that permits the burning of fuel in an excess of air at light loads, and efficient combustion over the entire load and speed span.

While the invention has been illustrated in its preferred embodiments, it will be clear to those skiled in the arts to which the invention pertains that many modifications and changes can be made thereto without departing from the scope of the invention.

I claim:
1. An internal combustion engine of the reciprocating piston type having a cylinder with a piston slidably movable therein for defining a variable volume chamber between one end of said cylinder and said piston, a swirl type combustion chamber offset laterally from the axis of said cylinder and having air-fuel mixture ignition means therein, laterally extending passage means connecting said combustion and cylinder chambers, first intake valve means for charging said cylinder with air having a swirling motion in a direction towards one end of said passage means, secondary intake valve means for introducing a mixture of fuel and air directly into said combustion chamber with a swirling motion in a direction away from the opposite end of said passage means to contain said mixture within said chamber, the volume of said combustion chamber being greater than the minimum clearance volume of said cylinder whereby the early stages of compression of said air by said piston transfers air from said cylinder through said passage into said combustion chamber at a rate promoting mixing of the air with the swirling fuel-air mixture therein, the later stages of compression effecting an increase in the rate of transfer of the cylinder chamber air into said combustion chamber sufficient to compress the mixture and move it to a point adjacent said ignition means substantially without mixing of said charge with the later stage compression air moving it, the latter stage of operation providing an ignitible mixture charge adjacent said ignition means at the time of ignition spreadable subsequent to ignition through said chamber and said passage into said cylinder to consume all fuel therein.

2. An internal combustion engine of the reciprocating piston type having a cylinder with a piston slidably movable therein for defining a variable volume chamber between one end of said cylinder and said piston, a combustion chamber adjacent one side of said cylinder having air-fuel mixture ignition means therein, laterally extending passage means connecting said combustion and cylinder chambers, first intake valve intake means for charging said cylinder with air having a swirling motion in a direction towards one end of said passage means, secondary intake valve means for introducing a mixture of fuel and air directly into said combustion chamber with a swirling motion in a direction away from the opposite end of said passage means to contain said mixture within said chamber, the volume of said combustion chamber being greater than the minimum clearance volume of said cylinder whereby the early stages of the compression stroke of said piston transfers air from said cylinder through said passage into said combustion chamber at a rate promoting mixing of the air with the fuel-air mixture therein, the respective portions of said passage means that open into said cylinder and chamber being tangential respectively to the walls of said cylinder and chamber whereby flow between the two is tangential to preserve the swirl motion and direction, the later stages of the piston compression stroke effecting a transfer of cylinder chamber air into said combustion chamber at a velocity sufficiently increased to form a jet of air, said passage means directing said jet of air to the bottom of said mixture to move it to a point adjacent said ignition means substantially without mixing of said charge with the air moving it, thereby presenting a fuel impregnated layer of air adjacent said ignition means, the latter stage of operation establishing an ignitible mixture in said impregnated layer at the time of ignition for complete combustion of said mixture and any residual lean mixture in said cylinder chamber spreadable subsequent to ignition through said chamber and said passage into said cylinder to consume all fuel therein.

3. An internal combustion engine of the reciprocating piston type having a longitudinally extending cylinder with a piston slidably movable therein defining a variable volume chamber between one end of said cylinder and said piston, a swirl type combustion chamber laterally offset from the longitudinal axis of said cylinder and having air-fuel mixture ignition means therein, laterally extending passage means connecting said combustion and cylinder chambers for transferring air between said chambers in a direction providing substantially tangential entry to the combustion chamber, first intake valve means for charging said cylinder with air having a swirling motion in a direction towards one end of said passage means, secondary intake valve means for introducing a mixture of fuel and air directly into said combustion chamber with a swirling motion in a direction away from the opposite end of said passage means to contain said mixture within said chamber, the volume of said combustion chamber being greater than the minimum clearance volume of said cylinder whereby the early stages of the compression stroke of said piston transferring air from said cylinder through said passage into said combustion chamber at a rate promoting mixing of the air with the fuel-air mixture therein, the later stages of the piston compression stroke effecting a transfer of cylinder chamber air into said combustion chamber at a velocity sufficiently increased to compress the mixture and move it towards said ignition means substantially without mixing of said charge with the cylinder compression stage air moving it, the latter stage of operation providing an ignitible mixture adjacent said ignition means at the time of ignition spreadable subsequent to ignition through said chamber and said passage into said cylinder to consume all fuel therein.

4. An internal combustion engine of the reciprocating piston type having a cylinder with a piston slidably movable therein for defining a variable volume chamber between one end of said cylinder and said piston, a swirl type combustion chamber located outside of said cylinder and having a lower portion adjacent the top portion of said cylinder, said combustion chamber having air-fuel mixture ignition means therein, laterally extending passage means connecting said combustion and cylinder chambers providing flow of fluid from the cylinder chamber into the bottom portion of said combustion chamber in a direction substantially tangential to a wall portion of said combustion chamber, air intake valve means for charging said cylinder chamber with air having a swirling motion in a direction towards one end of said passage means, secondary intake valve means for introducing a mixture of fuel and air directly into said combustion chamber with a swirling motion in a direction away from the opposite end of said passage means to contain said mixture within said chamber, the volume of said combustion chamber being greater than the minimum clearance volume of said cylinder whereby the early stages of the compression stroke of said piston effects low air velocities whereby air is transferred from said cylinder through said passage into said combustion chamber at a rate promoting mixing of the air with the fuel-air mixture therein, the later stages of the piston compression stroke effecting a rapid rise in the rate of transfer of cylinder chamber air into said combustion chamber causing the transfer air to assume the form of a jet to the bottom layer of the contents of said combustion chamber for moving the mixture therein towards said ignition means substantially without mixing of said charge with the air moving it, resulting in a fuel impregnated top layer of the contents, the latter stage of operation providing an ignitible air-fuel mixture adjacent said ignition means at the time of ignition spreadable subsequent to ignition through said chamber and said passage into said cylinder to consume all fuel therein.

5. An engine as in claim 4, said engine including a head member, said combustion chamber being located so as to overlap axially both said head member and cylinder.

References Cited by the Examiner
UNITED STATES PATENTS

| | | | |
|---|---|---|---|
| 1,643,396 | 9/1927 | Trussell. | |
| 1,887,072 | 11/1932 | Suder et al. | |
| 2,097,206 | 10/1937 | Candlish. | |
| 2,098,875 | 11/1937 | Mallory | 123—75 |
| 2,423,039 | 6/1947 | Miller | 123—32 |
| 2,590,000 | 3/1952 | Ferguson | 123—32.4 |
| 2,753,852 | 7/1956 | Beller. | |
| 2,779,319 | 1/1957 | Goschel | 123—32 |
| 2,799,257 | 7/1957 | Stumpfig et al. | 123—32 |
| 2,808,036 | 10/1957 | Von Seggern et al. | 123—32 |
| 2,882,873 | 4/1959 | Whitsky | 123—32 |
| 3,079,901 | 3/1963 | Hallberg | 123—32 |
| 3,092,088 | 6/1963 | Goosak et al. | 123—41.31 |
| 3,113,561 | 12/1963 | Heintz | 123—32 |
| 3,140,697 | 7/1964 | Peras | 123—32.4 |
| 3,174,470 | 3/1965 | Von Seggern et al. | 123—127 |
| 3,195,519 | 7/1965 | Bishop et al. | 123—32 |
| 3,230,939 | 1/1966 | Goossak | 123—32 |

FOREIGN PATENTS 394,647   9/1931   Great Britain.

MARK NEWMAN, *Primary Examiner.*
LAURENCE M. GOODRIDGE, *Examiner.*